United States Patent
Fanelli et al.

(10) Patent No.: US 11,758,577 B2
(45) Date of Patent: *Sep. 12, 2023

(54) NETWORK RESOURCE ALLOCATION FOR UNMANNED AERIAL VEHICLES

(71) Applicant: Verizon Patent and Licensing Inc., Basking Ridge, NJ (US)

(72) Inventors: Matthew S. Fanelli, Portland, OR (US); Jonathan Evans, Portland, OR (US); Amit Gupta, Highland Park, NJ (US); Parvez Ahmad, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,235

(22) Filed: Aug. 29, 2022

(65) Prior Publication Data

US 2022/0417941 A1    Dec. 29, 2022

Related U.S. Application Data

(63) Continuation of application No. 15/930,767, filed on May 13, 2020, now Pat. No. 11,432,302, which is a (Continued)

(51) Int. Cl.
    G08G 5/00    (2006.01)
    H04W 72/543  (2023.01)
    (Continued)

(52) U.S. Cl.
    CPC ........ *H04W 72/543* (2023.01); *G08G 5/0069* (2013.01); *H04W 4/40* (2018.02); *H04W 28/26* (2013.01); *H04W 72/21* (2023.01)

(58) Field of Classification Search
    CPC ..... H04W 72/087; H04W 4/40; H04W 28/26; H04W 72/0413; H04W 8/22; H04W 76/15; G08W 5/0069
    See application file for complete search history.

(56) References Cited

U.S. PATENT DOCUMENTS 10,394,240 B1   8/2019   Pounds
10,660,111 B2   5/2020   Fanelli et al.
(Continued)

*Primary Examiner* — Minh Trang T Nguyen

(57) ABSTRACT

A device receives network condition information. The network condition information is indicative of network resource availability at a plurality of locations. The device processes the network condition information to associate network resource availability identified in the network condition information with one or more airspace voxels that represent one or more three-dimensional (3D) portions of airspace corresponding to the plurality of locations. The device receives flight parameters relating to a proposed flight plan of an unmanned aerial vehicle (UAV) through airspace represented by a set of airspace voxels, and network performance parameters associated with the proposed flight plan. The device determines that the network resource availability that is associated with the set of airspace voxels fails to satisfy the network performance parameters, and performs one or more actions to enable the UAV to access network resources that satisfy the network performance parameters.

20 Claims, 7 Drawing Sheets

Related U.S. Application Data continuation of application No. 15/925,465, filed on Mar. 19, 2018, now Pat. No. 10,660,111.

(51) Int. Cl.
  *H04W 4/40* (2018.01)
  *H04W 28/26* (2009.01)
  *H04W 72/21* (2023.01)

(56) References Cited

U.S. PATENT DOCUMENTS

| | | | |
|---|---|---|---|
| 11,432,302 B2* | 8/2022 | Fanelli | H04W 4/029 |
| 2016/0307447 A1 | 10/2016 | Johnson et al. | |
| 2017/0012697 A1 | 1/2017 | Gong et al. | |
| 2017/0278409 A1 | 9/2017 | Johnson et al. | |
| 2018/0004207 A1 | 1/2018 | Michini et al. | |
| 2018/0096609 A1 | 4/2018 | De La Cruz et al. | |
| 2018/0292844 A1 | 10/2018 | Kosseifi et al. | |

* cited by examiner

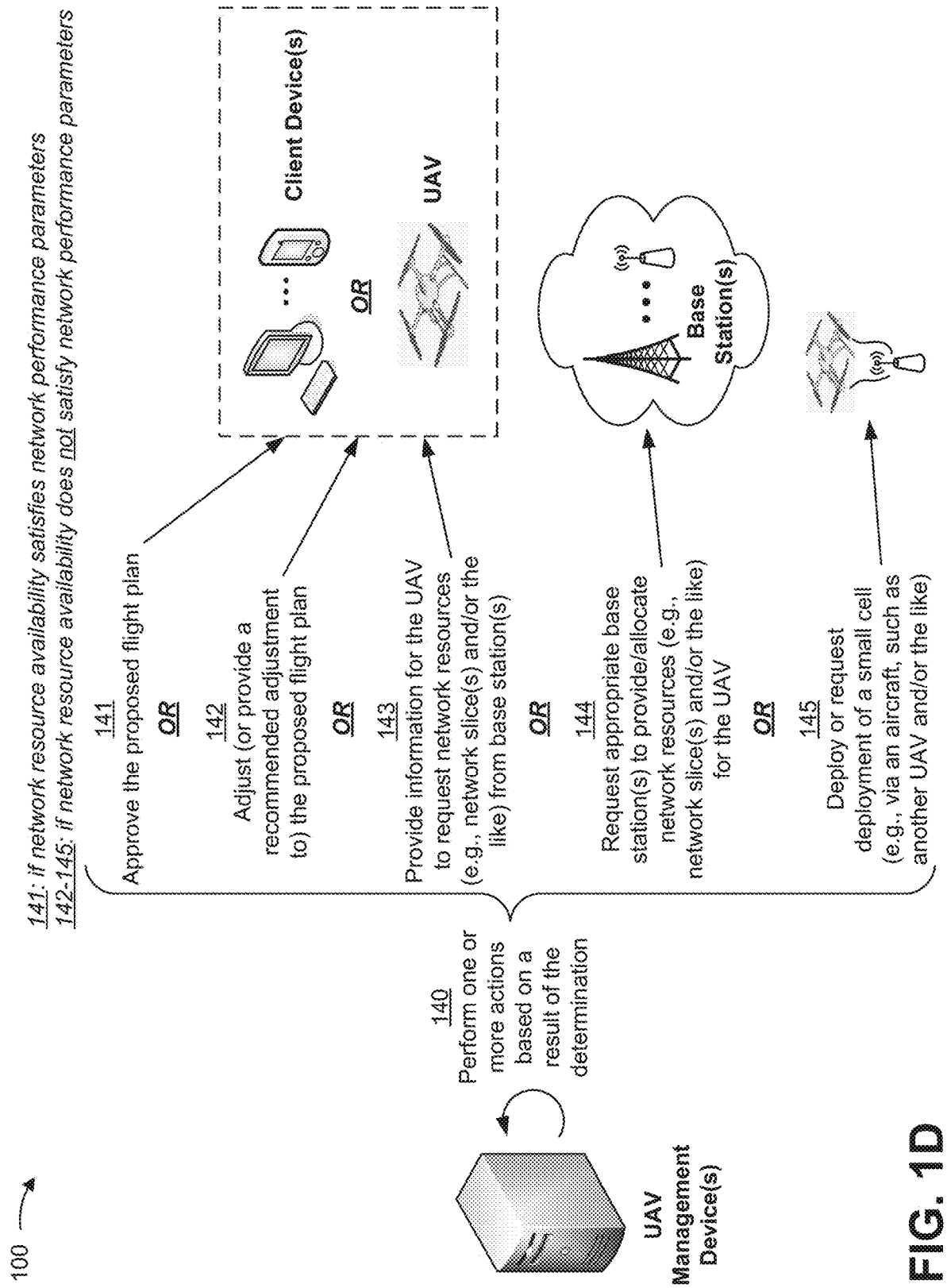

NETWORK RESOURCE ALLOCATION FOR UNMANNED AERIAL VEHICLES

RELATED APPLICATIONS

This application is a continuation of U.S. patent application Ser. No. 15/930,767, filed May 13, 2020, which is a continuation of U.S. patent application Ser. No. 15/925,465, filed Mar. 19, 2018 (now U.S. Pat. No. 10,660,111), each of which is incorporated herein by reference.

BACKGROUND

An unmanned aerial vehicle (UAV) is an aircraft without a human pilot aboard. UAVs are operated in a variety of missions, including those relating to cargo delivery, aerial photography and/or videography, data collection, and/or the like.

BRIEF DESCRIPTION OF THE DRAWINGS

FIGS. 1A-1D are diagrams of an overview of an example implementation described herein;

DETAILED DESCRIPTION OF PREFERRED EMBODIMENTS

Figure 1A:
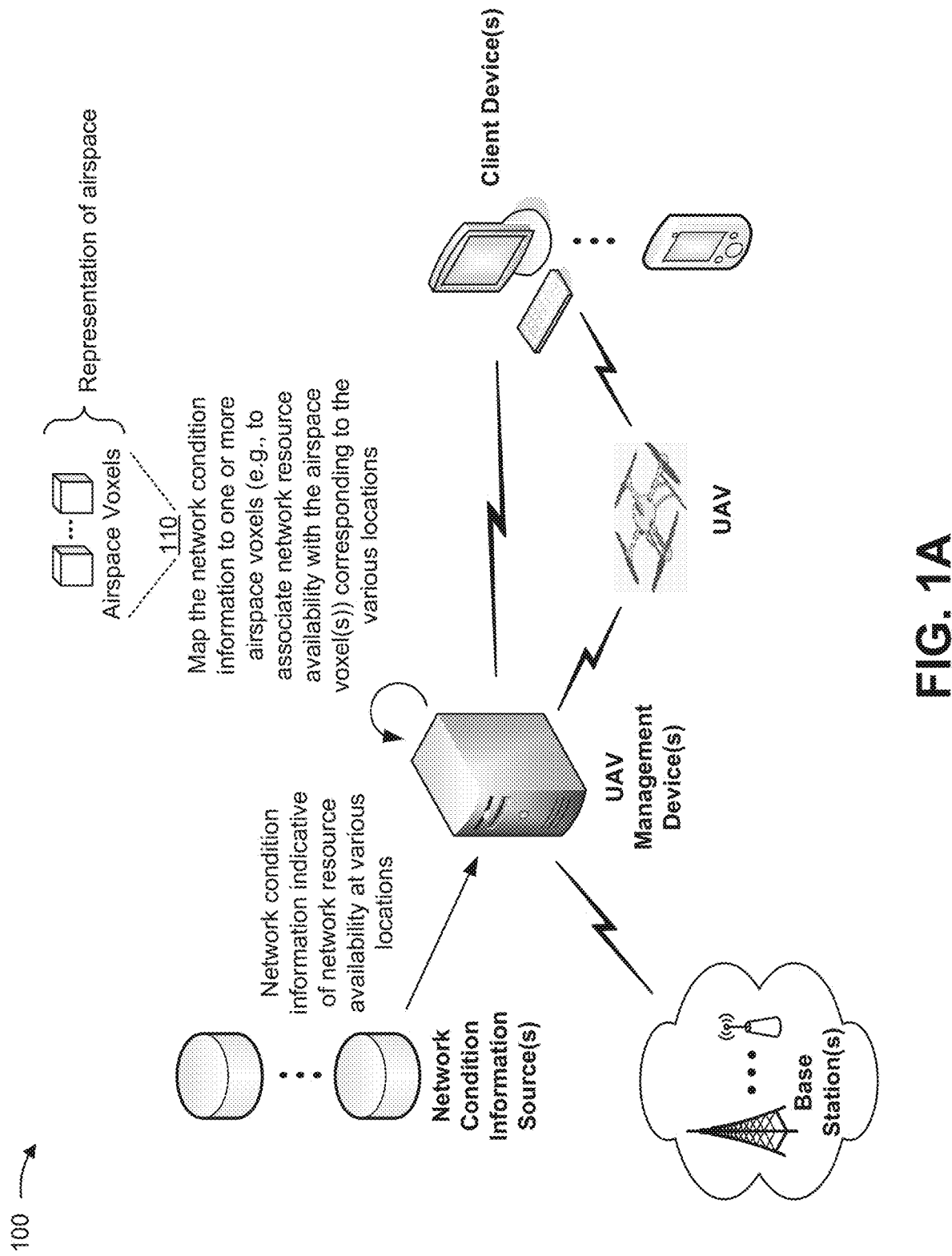

The following detailed description of example implementations refers to the accompanying drawings. The same reference numbers in different drawings can identify the same or similar elements.

UAVs are increasingly being employed in missions that require access to a network (e.g., a cellular or mobile network). In many cases, the success of a UAV's mission might depend on whether the UAV can remain connected to the network, and/or has access to sufficient resources from the network, during the flight or at an intended destination of the UAV. For example, in a case where a UAV is deployed to facilitate live video coverage of an event at a particular location, poor network service at the location can negatively impact the quality of the video stream and thus the overall mission.

Some implementations, described herein, provide a device (e.g., a UAV management device) that is capable of mapping network condition information (e.g., relating to bandwidth, throughput, latency, signal strength, signal coverage, and/or the like) to airspace voxels, and utilizing the mapping to determine whether sufficient network resources are available to satisfy network performance parameters relating to a flight plan of a UAV (e.g., network performance parameters that specify the network resources that are needed—the communication requirements—during a flight of the UAV and/or at an intended destination of the UAV). In some implementations, the device is capable of causing network resources to be dynamically allocated for, and/or extended network coverage to be dynamically provided to, a UAV according to the network performance parameters. In some implementations, the device is capable of adjusting the flight path of the UAV to route the UAV through areas in the airspace where available network resources satisfy the network performance parameters. In this way, a UAV can maintain connectivity and/or have access to sufficient network resources (e.g., throughout the flight and/or at an intended destination of the UAV) to carry out the UAV's mission, which increases the chance of success of the mission. In addition, this permits an operator of the UAV to constantly monitor/track the UAV as needed during the mission, which reduces or eliminates a need to deploy other UAVs to supplement (or re-attempt) a mission should the network connection be interrupted or lost (thereby conserving network resources, UAV resources, and/or the like). Furthermore, providing constant network connectivity to a UAV reduces or eliminates a need for the UAV to repeatedly try to reconnect to the network when a connection is lost, which conserves power and computing resources that would otherwise be wasted by the UAV for reconnection purposes.

FIGS. 1A-1D are diagrams of an overview of an example implementation 100 described herein.

As shown in FIGS. 1A-1D, example implementation 100 can include a UAV management device (e.g., implemented as one or more devices, such as one or more server devices) that is in communication with client devices (e.g., regarding proposed flight plans and/or the like). The UAV management device can additionally communicate with one or more UAVs (e.g., UAV(s) that are in flight or are preparing for flight). In some implementations, the UAV management device can include an airspace control system (e.g., an unmanned aircraft traffic management (UTM) system) that is capable of receiving and processing airspace access requests and providing notifications regarding such requests.

As shown in FIG. 1A, the UAV management device can receive network condition information (e.g., from network condition information source(s)) that is indicative of network resource availability (and/or usage) at various locations or regions, such as cells, areas within or near cells, and/or the like (e.g., identified by coordinates provided by a global navigation system, street addresses, cell identifiers, and/or the like) that are served by one or more base station(s) of a network operator. In some implementations, the UAV management device can receive the network condition information from a network operator (e.g., from one or more devices controlled by, or associated with, a network operator, such as base station(s) or other device(s) (e.g., implementing network performance monitoring tool(s)) communicatively coupled to the base station(s)). Additionally, or alternatively, the UAV management device can receive the network condition information from other sources, such as third parties. In either case, the network condition information can be based on network resource usage data and/or statistics (including network coverage information, such as coverage map(s)) that are obtained and/or determined (e.g., through testing, monitoring, and/or the like) periodically (e.g., annually, quarterly, monthly, weekly, daily, and/or the like), continuously, based on user input or request, and/or the like.

In some implementations, the network condition information associated with a particular location can provide an indication as to expected network resource availability (and/or usage) at the particular location. For example, the network condition information can include, for each location, information regarding expected network bandwidth availability, expected network throughput, expected network latency, expected network signal strength, expected network signal coverage, and/or the like.

In some implementations, the network condition information can include historical network condition information. For example, the network condition information can include, for each location, information regarding historically available network bandwidth, historical network throughput, historical network latency, historical network signal strength, historical network signal coverage, and/or the like, at different times of day, on different days of a week, on different days of a month, during various environmental conditions, such as weather conditions (e.g., during various types of precipitation, during various wind speeds and/or directions, and/or the like), and/or the like.

Additionally or alternatively, and in some implementations, the network condition information can include real-time (or near real-time) information. For example, the network condition information can be based on data and/or statistics obtained and/or determined by network performance monitoring tool(s) and provided upon request or periodically (e.g., daily, hourly, once per 15 minutes, and/or the like). For example, the network condition information can include, for each location, information regarding the currently (or recently) available network bandwidth, current (or recent) network throughput, current (or recent) network latency, current (or recent) network signal strength, current (or recent) network signal coverage, and/or the like.

As shown in FIG. 1A, and by reference number 110, the UAV management device can map network resource availability identified in the network condition information to one or more airspace voxels (e.g., to characterize and/or associate network resource availability with the one or more airspace voxels) that represent one or more three-dimensional (3D) portions of airspace corresponding to the various locations. In some implementations, the UAV management device can generate the airspace voxel(s) to each define a portion of 3D airspace, and map the network resource availability to the airspace voxel(s) based on the network condition information.

Figure 1B:
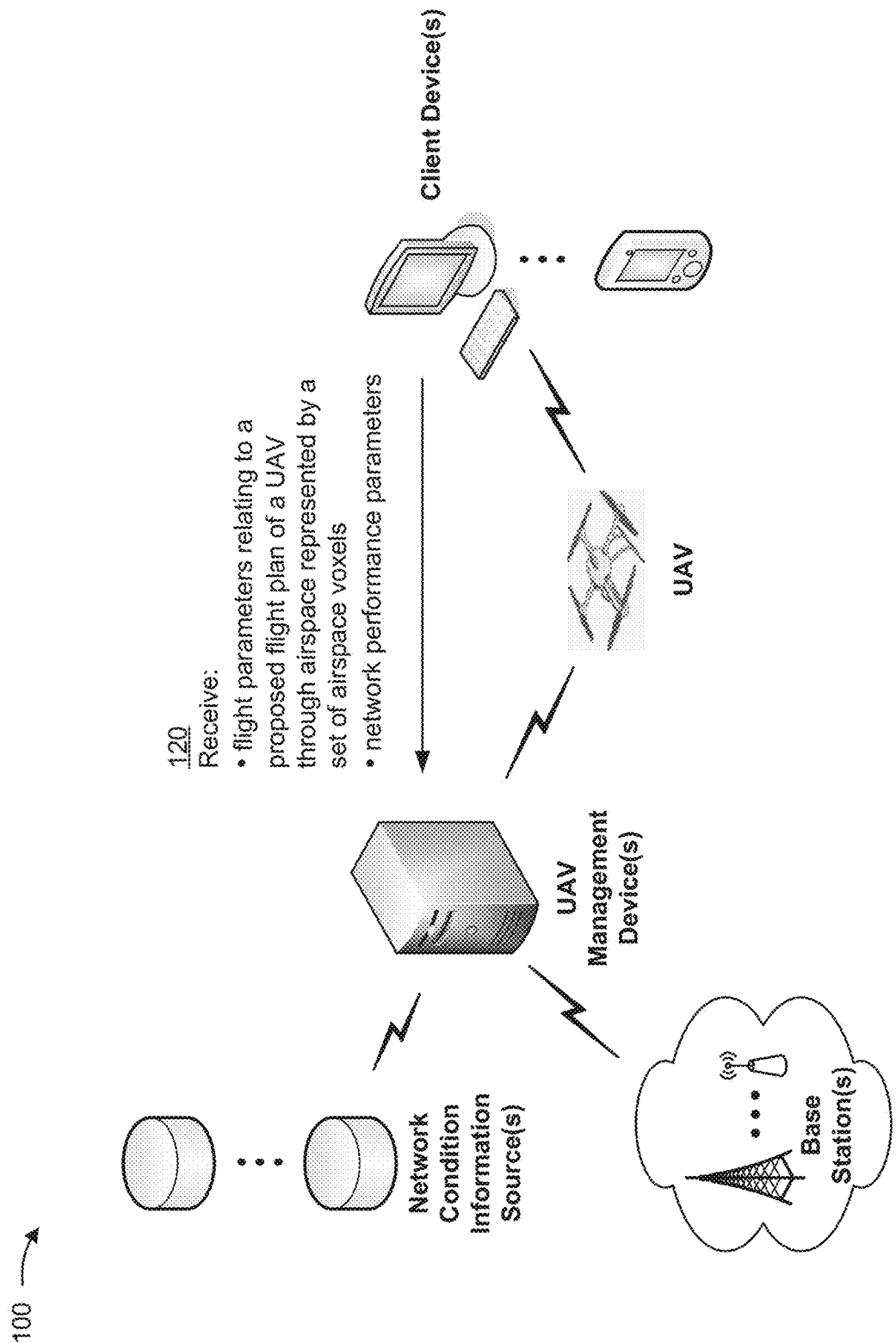

As shown in FIG. 1B, and by reference number 120, the UAV management device can receive, from a client device, flight parameters relating to a proposed flight plan of a UAV through airspace represented by a set of airspace voxels, and network performance parameters relating to the proposed flight plan.

In some implementations, the proposed flight plan can include departure (e.g., origin) location(s), arrival (e.g., destination) location(s), information associated with the set of airspace voxels, and/or the like. In some implementations, a flight parameter can include aircraft or UAV parameters (e.g., specifications, payload information, airworthiness information, noise information, etc.). Additionally, or alternatively, and where applicable, a flight parameter can include pilot parameters (e.g., registration information, qualification information, etc.). Additionally, or alternatively, a flight parameter can include analysis parameters, such as analysis parameters relating to entity preferences. Entity preferences can include, for example, preferences regarding risk tolerance, cost tolerance, time tolerance, network tolerance, etc. associated with an owner of the UAV, a pilot (if any) of the UAV, and/or the like.

In some implementations, the network performance parameters can include network performance requests or requirements for the proposed flight plan, including, for example, network throughput requirement(s), network latency requirement(s), network signal strength requirement(s), network signal coverage requirement(s), and/or the like, during the flight and/or at an intended destination identified in the proposed flight plan. For example, in a case where a mission of the UAV is to facilitate live stream video coverage (e.g., 4K streaming) of an event at a particular destination, the network performance parameters can specify information regarding the network throughput, the network latency, the network signal strength, the network signal coverage, and/or the like that are needed to enable the UAV to provide the video stream with minimal to no service interruption. Additionally, or alternatively, in a case where a mission of the UAV demands constant connectivity to a network, such as throughout a flight and/or during one or more portions of the flight, the network performance parameters can specify information regarding the network throughput, the network latency, the network signal strength, the network signal coverage, and/or the like that are needed to enable the UAV to remain connected to the network with minimal to no service interruption.

Figure 1C:
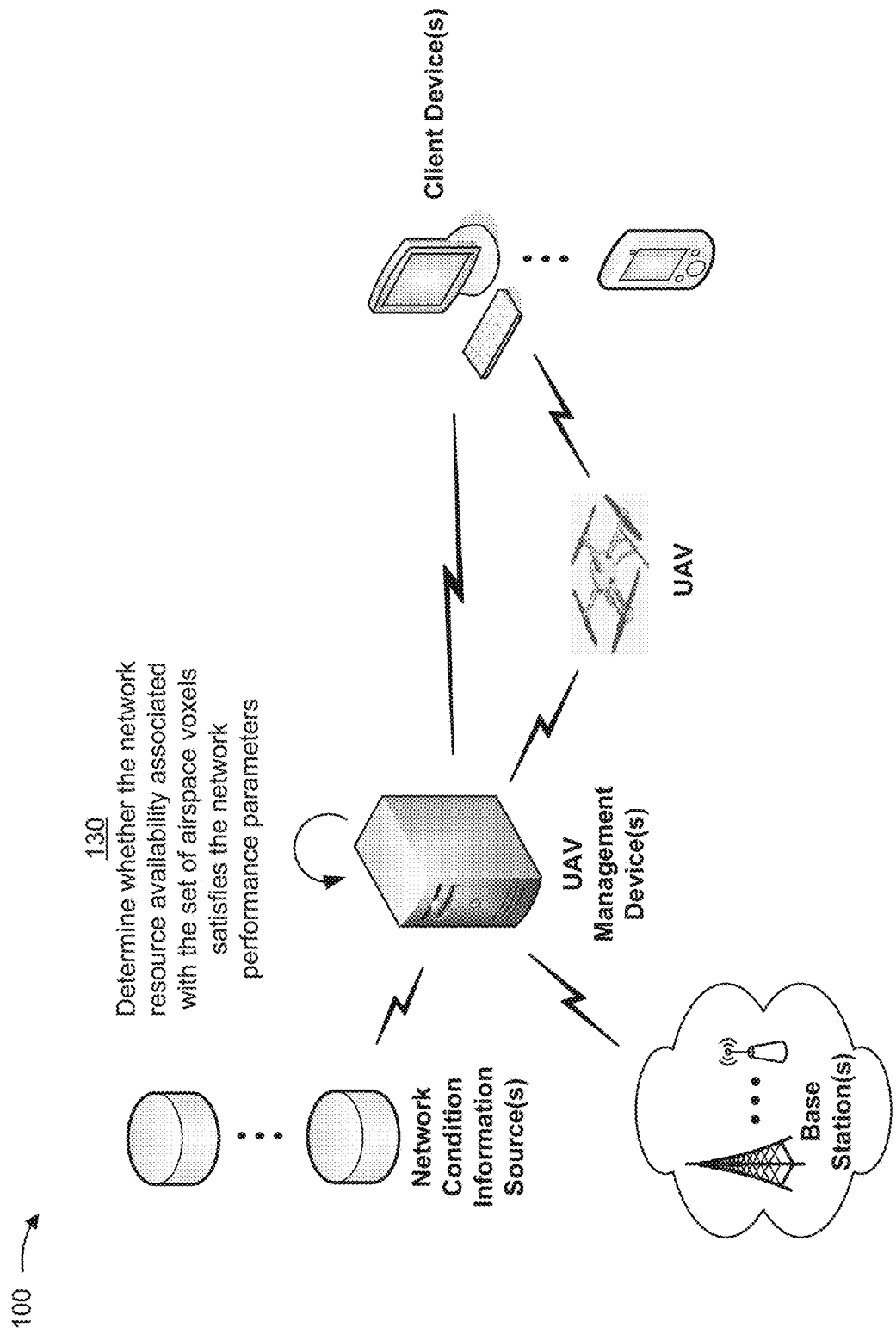

As shown in FIG. 1C, and by reference number 130, the UAV management device can determine whether the network resource availability that is associated with the set of airspace voxels satisfies the network performance parameters. In some implementations, the UAV management device can determine whether the network resource availability satisfies the network performance parameters by comparing the network resource availability and the network performance parameters (e.g., by comparing the available network bandwidth, network throughput, and/or the like and the needed network bandwidth, network throughput, and/or the like specified in the network performance parameters). In some implementations, the UAV management device can compare the network resource availability and the network performance parameters on a voxel-by-voxel basis.

In some implementations, the UAV management device can take into account network resources that might be needed by other UAVs (e.g., based on flight plans and/or network performance parameters associated with other UAVs) when determining whether sufficient network resources are, or will be, available to a first UAV. For example, the UAV management device can determine that there are insufficient network resources to satisfy the network performance parameters relating to the first UAV, if one or more other UAVs are expected to simultaneously share the same airspace (e.g., the same voxel(s) or neighboring voxel(s)) with the first UAV and are expected to utilize a threshold portion of the network resources.

As shown in FIG. 1D, and by reference number 140, the UAV management device can perform an action based on a result of the determination. In some implementations, and as shown by reference number 141, the UAV management device can approve the proposed flight plan if the UAV management device determines that the network resource availability that is associated with the set of airspace voxels satisfies the network performance parameters. In this case, for example, the UAV management device can respond to the client device with an approval relating to network resources for the proposed flight plan (e.g., to indicate that network resources are sufficient, or will be made available, for the proposed flight plan).

In a case where the UAV management device determines that the network resource availability that is associated with the set of airspace voxels does not satisfy the network performance parameters, the UAV management device can perform one or more other actions, as described below with respect to reference numbers 142-145.

As further shown in FIG. 1D, and by reference number 142, the UAV management device can adjust (or provide a recommended adjustment to) the proposed flight plan. For example, in a case where the network performance parameters specify a need for constant connectivity at a particular signal strength, where the network resource availability associated with a first airspace voxel of the set of airspace voxels does not satisfy the needed signal strength, but where the network resource availability associated with an airspace voxel, adjacent to the first airspace voxels and not included in the set of airspace voxels, satisfies the needed signal strength, the UAV management device can adjust the proposed flight plan, and/or recommend an adjustment to the proposed flight plan, such that the UAV would avoid the first airspace voxel, and traverse the adjacent airspace voxel.

In some implementations, the UAV management device can provide updated information regarding network resource availability to a UAV while the UAV is in flight. For example, in a case where a UAV is currently in flight in accordance with a prior approved flight plan (e.g., approved in view of the network performance parameters described above), and the UAV management device determines (e.g., based on real-time, or near real-time network condition information received from a network operator, base station(s) of the network operator, and/or the like) that the UAV might not have access to sufficient network resources in an upcoming portion of the flight, the UAV management device can determine an alternate flight path for the UAV—e.g., through areas of airspace where there are likely sufficient network resources—and provide information regarding the alternate flight path to the UAV (e.g. in real-time or near real-time).

As further shown in FIG. 1D, and by reference number 143, the UAV management device can provide (e.g., to the UAV and/or the client device) information that the UAV can utilize to request network resources from one or lore base stations (e.g., network resource request information regarding quality of service (QoS) requirements). In a case where the network performance parameters are associated with network performance needs during the flight, the UAV can provide the information to one or more base stations that provide network coverage along the flight path of the UAV. Additionally, or alternatively and in case where the network performance parameters are associated with network performance needs at an intended destination of the UAV, the UAV can provide the information to one or more base stations that provide network coverage at the intended destination.

In some implementations, the UAV management device can provide information that the UAV can utilize to request bandwidth or resource reservation (e.g., to reserve a portion of bandwidth in a network or interface for a period of time). This might be needed for a mission that involves real-time video/audio streaming, where packet re-routing and re-transmission might negatively impact the quality of the video/audio stream. Additionally, or alternatively, the UAV management device can provide information that the UAV can utilize to request latency management (e.g., to limit the latency in data transfer associated with the UAV to a maximum value). Additionally, or alternatively, the UAV management device can provide information that the UAV can utilize to request data traffic prioritization (e.g., such that data traffic associated with the UAV has higher priority over other data traffic).

As further shown in FIG. 1D, and by reference number 144, the UAV management device can provide one or more requests to one or more appropriate base stations (e.g., those base station(s) that serve areas of airspace through which the UAV is expected to traverse, those base station(s) that serve areas that include the intended destination of the UAV, and/or the like) to provide and/or allocate network resources for the UAV. In some implementations, the UAV management device can provide request(s) via communication path(s) established between the UAV management device and the base station(s) (e.g., via a serving gateway (SGW), a packet data network gateway (PGW), another device, and/or the like). In some implementations, the UAV management device can provide one or more requests for bandwidth and/or resource management, latency management, traffic prioritization, and/or the like, as described above.

In some implementations, a base station can independently allocate network resources to one or more UAVs located within ail area served by the base station. For example, if two UAVs are in the same area simultaneously, a base station can identify the UAVs (e.g., based on subscriber profiles, subscriber IDs, and/or the like), and spread, or allocate, the network resources among the UAVs for load balancing purposes. In a case where a UAV is capable of communicating over various frequencies, and where the UAV is communicating over a first frequency (e.g., band 13) that is becoming overwhelmed with traffic, a base station can redirect the UAV to communicate over a second frequency (e.g., band 4) so as to spread out the network load. In some implementations, and in a case where a $5^{th}$ Generation (5G) network is involved, one or more base stations and/or associated device(s) or system(s) can allocate one or more network slices and/or related network resources, as needed for UAV operations. In some implementations, the UAV management device can be configured to track and/or receive information regarding available network resources provided by one or more other network operators, and to utilize the information to provide recommendations regarding proposed flight plans, submit requests to such network operator(s) for network resource allocation purposes (e.g., in accordance with roaming agreements and/or the like), and/or the like.

As further shown in FIG. 1D, and by reference number 145, the UAV management device can aerially deploy, or request aerial deployment of, a small cell base station (e.g., an evolved NodeB), a distributed antenna system (DAS), and/or the like (e.g., via an aircraft, such as another UAV and/or the like) to provide upgraded service to, and/or extend network coverage for, the UAV, as needed. In some implementations, the UAV management device can arrange to have the deployed aircraft fly along with the UAV (e.g., in a case where the network performance parameters are associated with network performance needs during the flight) and/or stationed at an intended destination of the UAV (e.g., in a case where the network performance parameters are associated with network performance needs at the intended destination).

In this way, the UAV management device can recommend that the UAV take a flight path where network resources are sufficient to satisfy communication requirements for the UAV and/or arrange for sufficient network resources to be provided to the UAV along a flight path of the UAV or at an intended destination of the UAV.

In some implementations, the UAV management device can perform the one or more actions (e.g., any of the above-described actions) to ensure that sufficient network resources are available to the UAV (whether by adjusting the proposed flight plan of the UAV, by arranging for base stations to allocate and/or provide network resources, and/or the like) such that requirement(s) (e.g., specified by an entity, such as an owner of the UAV, a pilot (if any) of the UAV, and/or the like), relating to the flight parameters and the network performance parameters, are satisfied. For example, the UAV management device can perform the one or more actions such that a probability of the UAV having access to sufficient network resources satisfies a threshold probability (e.g., is greater than or equal to "five nines" (99.999%), "six nines" (99.9999%), "seven nines" (99.99999%), and/or the like).

In some implementations, the UAV management device can prevent network resources from being provided and/or allocated to a UAV unless a subscriber associated with the UAV (e.g., a subscriber to one or more UAV-related services provided by the UAV management device and/or network service(s) provided by a network operator) has an appropriate e.g., an upgraded) subscription plan. In such a case, the UAV management device can (e.g., after determining that network resource availability along a flight path of a UAV does not satisfy network performance parameters requested in a proposed flight plan of the UAV) prompt a subscriber (e.g., via a client device) to obtain an upgraded subscription, and/or provide an option for the subscriber (e.g., via the client device) to accept the upgraded subscription.

In some implementations, the UAV management device can map the network condition information (e.g., the network resource availability identified in the network condition information) to the one or more voxels (as described with respect to reference number 110) prior to receiving flight parameters. Additionally, or alternatively, the UAV management device can perform mapping or determinations of availability of network resources after receiving the flight parameters and/or based on receiving the flight parameters.

As indicated above, FIGS. 1A-1D are provided merely as examples. Other examples are possible and can differ from what was described with regard to FIGS. 1A-1D.

In this way, a UAV can maintain connectivity and/or have access to sufficient network resources (e.g., throughout the flight and/or at an intended destination of the UAV) to carry out the UAV's mission, which increases the chance of success of the mission. In addition, this permits an operator of the UAV to constantly monitor/track the UAV as needed during the mission, which reduces or eliminates a need to deploy other UAVs to supplement (or re-attempt) a mission should the network connection be interrupted or lost (thereby conserving network resources, UAV resources, and/or the like). Furthermore, providing constant network connectivity to a UAV reduces or eliminates a need for the UAV to repeatedly try to reconnect to the network when a connection is lost, which conserves power and computing resources that would otherwise be wasted by the UAV for reconnection purposes.

Figure 2:
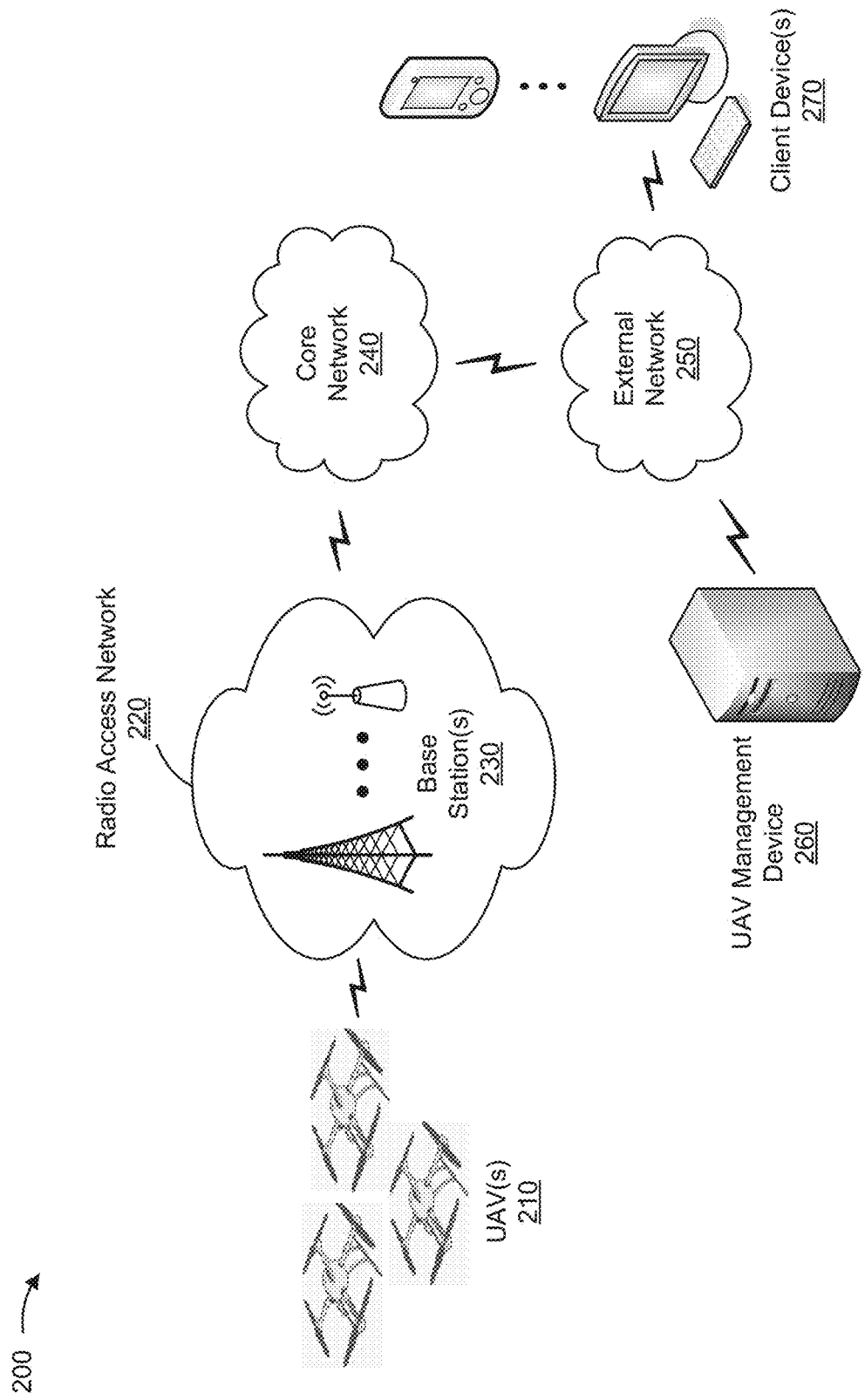
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more UAVs 210 (hereinafter referred to individually as "UAV 210," and collectively as "UAVS 210"), a radio access network (RAN) 220, one or more base stations 230 (hereinafter referred to individually as "base station 230," and collectively as "base stations 230"), a core network 240, an external network 250, a UAV management device 260, and one or more client devices 270 (hereinafter referred to individually as "client device 270," and collectively as "client devices 270"). Devices of environment 200 can interconnect via wired connections, wireless connections, or a combination of wired and wireless connections.

UAV 210 includes an aircraft without a human pilot aboard, and can also be referred to as an unmanned aircraft (UA), a drone, a remotely piloted vehicle (RPV), a remotely piloted aircraft (RPA), or a remotely operated aircraft (ROA). UAV 210 can have a variety of shapes, sizes, configurations, characteristics, etc. for a variety of purposes and applications. In some implementations, UAV 210 can include one or more sensors, such as an electromagnetic spectrum sensor (e.g., a visual spectrum, infrared, or near infrared camera, a radar system, and/or the like), a biological sensor, a temperature sensor, a chemical sensor, and/or the like. In some implementations, UAV 210 can include one or more components for communicating with one or more base stations 230. Additionally, or alternatively, UAV 210 can transmit information to and/or can receive information from UAV management device 260, such as sensor data, flight plan information, and/or the like. Such information can be communicated via base stations 230, core network 240, and/or external network 250.

RAN 220 includes one or more radio access networks such as, for example, a code division multiple access (CDMA) RAN, a time division multiple access (TDMA) RAN, a frequency division multiple access (FDMA) RAN, a universal terrestrial radio access network (UTRAN), an evolved UTRAN (E-UTRAN) (e.g., a long-term evolution (LTE) RAN, an LTE-Advanced (LTE-A) RAN, an LTE-unlicensed (LTE-U) RAN, etc.), and/or the like. RAN 220 can include one or more base stations 230 that provide access for UAVs 210 to core network 240.

Base station 230 includes one or more devices capable of transferring traffic, such as audio, video, text, and/or other traffic, destined for and/or received from UAV 210. In some implementations, base station 230 can include an evolved NodeB (eNB) associated with an LTE RAN that receives traffic from and/or sends traffic to UAV management device 260 and/or client devices 270 via core network 240. Additionally, or alternatively, one or more base stations 230 can be associated with a RAN that is not associated with the LTE network. Base station 230 can send traffic to and/or receive traffic from UAV 210 via an air interface. Base stations 230 can include different types of base stations, such as a macro cell base station or a small cell base station (e.g., a micro cell base station, a pica cell base station, and/or a femto cell base station). A macro cell base station can cover a relatively large geographic area (e.g., several kilometers in radius). A small cell base station can be a lower-powered base station, as compared with a macro cell base station, that can operate in the same or different (e.g., licensed, unlicensed, etc.) frequency bands as macro cell base stations.

Core network 240 includes a network that enables communications between RAN 220 (e.g., base stations 230) and one or more devices and/or networks connected to core network 240. For example, core network 240 can include an evolved packet core (EPC). Core network 240 can include one or more mobility management entities (MMEs), one or more SGWs, and one or more PGWs that together provide mobility functions for UAVs 210 and enable UAVs 210 to communicate with other devices of environment 200.

In cases where a 5G network is included in RAN 220 and/or core network 240, environment 200 can include network elements that operate based on a $3^{rd}$ Generation Partnership Project (3GPP) 5G wireless communication standard. RAN 220 can include base stations 230 that include elements that implement a 5G radio interface via which UAVs 210, UAV management device 260, client devices 270 communicate through environment 200, including associated antennas and antenna systems. Core network 240 can include one or more 5G network slices under the management of an orchestration entity (not shown) that enable UAVs 210, UAV management device 260, client devices 270 to communicate with external network 250.

External network 250 includes one or more wired and/or wireless networks. For example, external network 250 can include a cellular network (e.g., an LTE network, a CDMA network, a $3^{rd}$ Generation (3G) network, a $4^{th}$ Generation (4G) network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

UAV management device 260 includes one or more devices capable of managing UAVs 210 and/or flight plans for UAVs 210. For example, UAV management device 260 can include a server device, a desktop computer, a laptop computer, or a similar device. In some implementations, UAV management device 260 can communicate with one or more devices of environment 200 (e.g., UAV 210, client devices 270, etc.) to receive information regarding flight plans for UAVs 210 and/or to provide recommendations associated with such flight plans, as described elsewhere herein. In some implementations, UAV management device 260 can permit a user of a client device 270 to control UAVs 210 via UAV management device 260. In some implementations, UAV management device 260 can be included in a data center, a cloud computing environment, a server farm, and/or the like, which can include multiple UAV management devices 260. While shown as being external from core network 240, in some implementations, UAV management device 260 can reside within core network 240.

Client device 270 includes one or more devices capable of receiving, storing, processing, and/or providing information associated with UAVs 210 and/or UAV management device 260. For example, client device 270 can include a desktop computer, a laptop computer, a tablet computer, a mobile phone, or a similar device. In some implementations, a user can interact with client device 270 to request a flight plan analysis and/or recommendation, for a UAV 210, from UAV management device 260.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
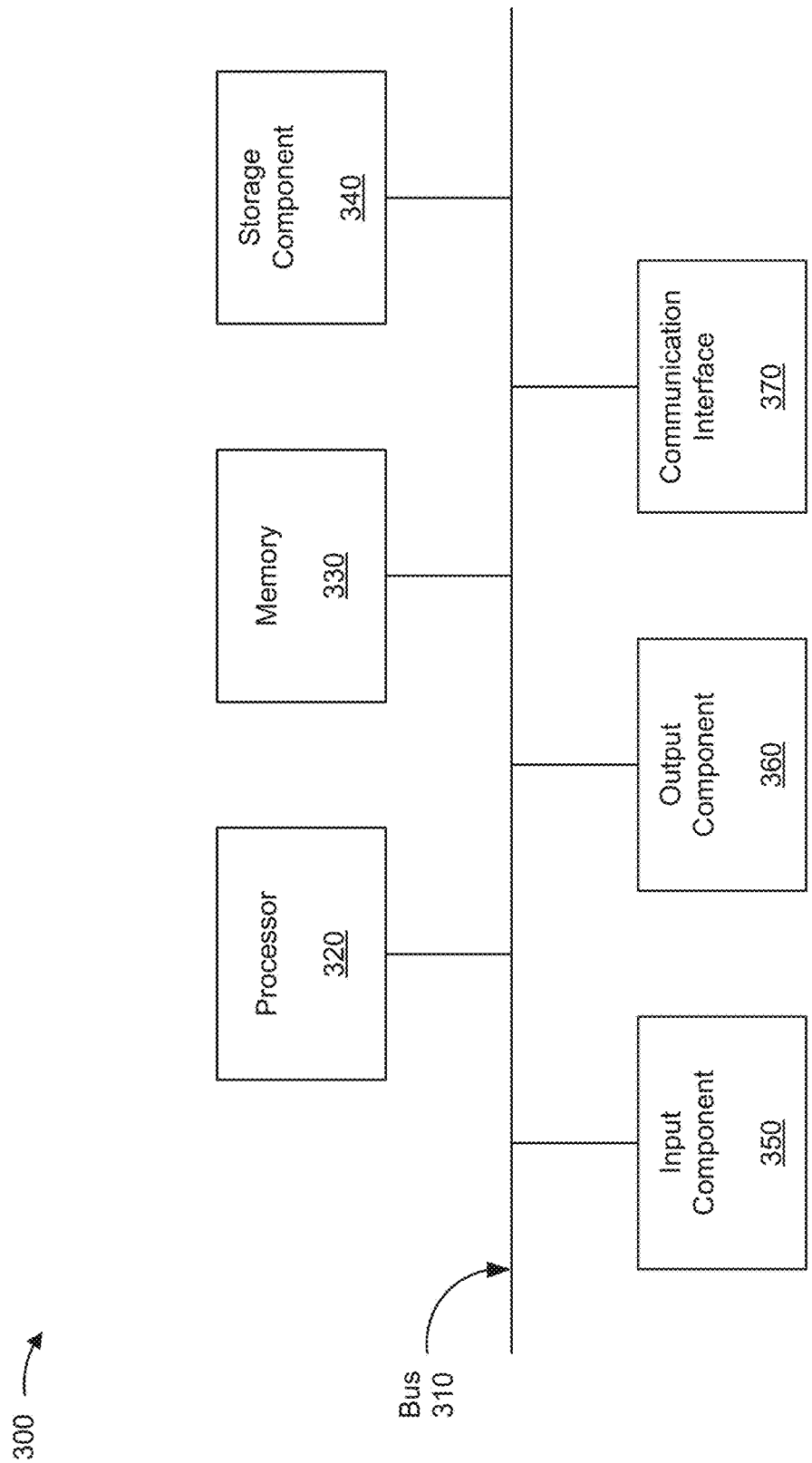
FIG. 3 is a diagram of example components of one or more devices of FIG. 2.

FIG. 3 is a diagram of example components of a device 300. Device 300 can correspond to UAV 210, base station 230, UAV management device 260, and/or client device 270. In some implementations, UAV 210, base station 230, UAV management device 260, and/or client device 270 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a GPS component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
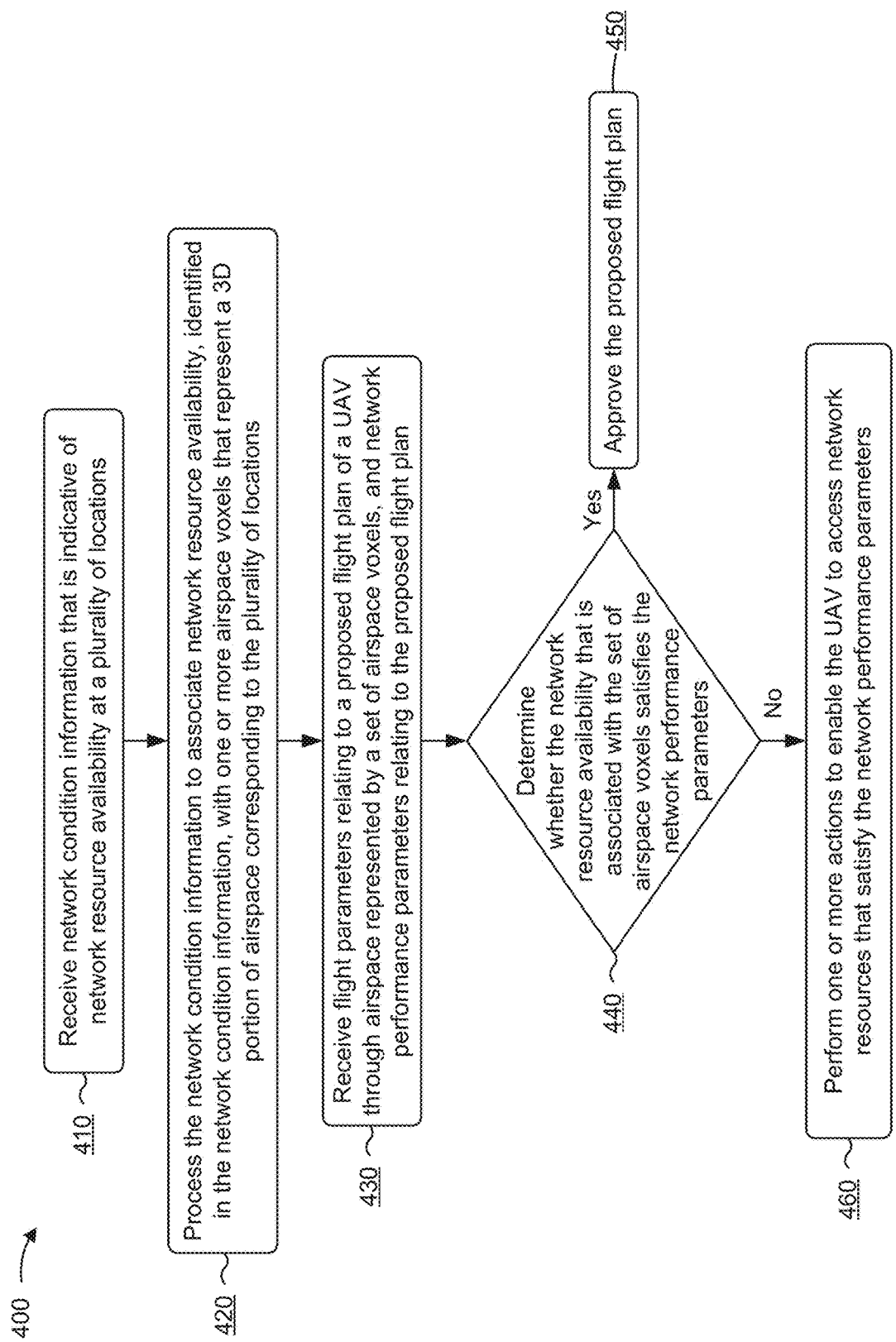
FIG. 4 is a flow chart of an example process for dynamically allocating network resources for UAVs.

FIG. 4 is a flow chart of an example process 400 for dynamically allocating network resources for UAVs. In some implementations, one or more process blocks of FIG. 4 can be performed by UAV management device 260. In some implementations, one or more process blocks of FIG. 4 can be performed by another device or a group of devices separate from or including UAV management device 260, such as UAV 210, base station 230, and/or client device 270.

As shown in FIG. 4, process 400 can include receiving network condition information that is indicative of network resource availability at a plurality of locations (block 410). For example, UAV management device 260 can receive (e.g., using processor 320, memory 330, storage component 340, communication interface 370, and/or the like) network condition information, that is indicative of network resource availability at a plurality of locations, from client device 270 via external network 250 and/or from UAV 210 via external network 250, core network 240, and/or one or more base stations 230. In practice, UAV management device 260 can receive thousands, millions, billions, etc. of information elements from hundreds, thousands, etc. of sources. In this way, UAV management device 260 can receive network condition information in a manner that cannot be performed manually or objectively by a human actor. In some implementations, UAV management device 260 can receive the network condition information in a manner that is the same as or similar to that described above with respect to FIGS. 1A-1D.

In some implementations, the network condition information can include, for each location, historical (and/or real-time (or near real-time)) network condition information regarding network bandwidth (e.g., available network bandwidth), network throughput, network latency, network signal strength, network coverage, and/or the like, as described elsewhere herein (e.g., with respect to FIGS. 1A-1D above).

In this way, UAV management device 260 can receive network condition information that is indicative of network resource availability at a plurality of locations to cause UAV management device 260 to process the network condition information to associate network resource availability identified in the network condition information with one or more airspace voxels that represent a 3D portion of airspace corresponding to the plurality of locations.

As further shown in FIG. 4, process 400 can include processing the network condition information to associate network resource availability identified in the network condition information with one or more airspace voxels that represent a 3D portion of airspace corresponding to the plurality of locations (block 420). For example, UAV management device 260 can process (e.g., using processor 320 and/or the like) the network condition information to associate network resource availability identified in the network condition information with one or more airspace voxels that represent a 3D portion of airspace corresponding to the plurality of locations. In some implementations, UAV management device 260 can process the network condition information based on receipt of the network condition information, based on receipt of a user input, based on receipt of a third-party request, based on an occurrence of a triggering event, and/or the like. In practice, UAV management device 260 can process thousands, millions, billions, etc. of information elements. In this way, UAV management device 260 can process network condition information in a manner that cannot be performed manually or objectively by a human actor. In some implementations, UAV management device 260 can process the network condition information in a manner that is the same as or similar to that described above with respect to FIGS. 1A-1D.

In some implementations, UAV management device 260 can divide airspace into numerous (e.g., thousands of, millions of, billions of, etc.) airspace voxels. In some implementations, UAV management device 260 can represent each airspace voxel using a group of coordinates (e.g., coordinate information, including latitude information, longitude information, elevation information, and/or the like) that define the dimensions of the airspace voxel. In some implementations, UAV management device 260 can receive airspace voxels as input (e.g., based on an input from a user of a client device, such as client device 270, based on input(s) provided by one or more other devices, such as one or more management devices, and/or the like) and/or generate airspace voxels.

In some implementations, a quantity of airspace voxels managed by UAV management device 260 can vary based on a size of an airspace voxel, a scale of the UAV network managed by UAV management device 260, and/or the like. In some implementations, different UAV management devices 260 can manage UAV traffic at different scales, such as a global voxel scale to manage long-distance flights, a regional voxel scale to manage flights within a particular geographic region, a city-wide scale to manage urban flights, and/or the like.

In some implementations, the shapes and sizes of airspace voxels can vary (e.g., an airspace voxel can be shaped as a hexahedron, a pyramid, and/or another plesiohedra, and can represent a different volume of space based on the position (e.g., coordinates) associated with the airspace voxel). For example, in some cases, network conditions in a voxel of a particular size at one location can be different than network conditions in another voxel of the same size at another location (e.g., network conditions over a hill may be different than network conditions over a river). In such cases, UAV management device 260 can adjust the size of one or more voxels at various locations—e.g., by optimally sizing the voxel(S)—and provide recommendations regarding network resource availability, in connection with proposed flight plans, based on the optimally-sized voxel(s). Alternatively, and in some implementations, airspace voxels can have uniform shapes and sizes, such as 3D cubes that are all the same size (e.g., that all represent the same amount of volume of space).

In some implementations, an airspace voxel can be associated with a particular time period. In this way, the name 3D portion of airspace can be associated with different parameters at different times, as conditions in the airspace change. In some implementations, a time period can have different granularities, such as an indefinite period, one or more days, one or more hours, one or more minutes, one or more seconds, and/or the like.

In some implementations, 3D points corresponding to the data regarding network resource availability identified in the network condition information and/or corresponding to any other data (e.g., map data, etc.) can be represented by an identifier, an equation, and/or the like to reduce the amount of memory needed to store each airspace voxel.

In this way, UAV management device 260 can process the network condition information to associate network resource availability identified in the network condition information with one or more airspace voxels that represent a 3D portion of airspace corresponding to the plurality of locations to cause UAV management device 260 to receive flight parameters relating to a proposed flight plan of a UAV through airspace represented by a set of airspace voxels, and network performance parameters associated with the proposed flight plan.

As further shown in FIG. 4, process 400 can include receiving flight parameters relating to a proposed flight plan of a UAV through airspace represented by a set of airspace voxels, and network performance parameters relating to the proposed flight plan (block 430). For example, UAV management device 260 can receive (e.g., using processor 320, memory 330, storage component 340, communication interface 370, and/or the like) flight parameters relating to a proposed flight plan of a UAV 210 through airspace represented by a set of airspace voxels, and network performance parameters relating to the proposed flight plan. In some implementations, UAV management device 260 can receive the flight parameters from client device 270 via external network 250 and/or from UAV 210 via external network 250, core network 240, and/or one or more base stations 230. In practice, UAV management device 260 can receive thousands, millions, billions, etc. of flight parameters and network performance parameters relating to proposed flight plans from hundreds, thousands, etc. of client devices 270 and/or UAVs 210. In this way, UAV management device 260 can receive flight parameters and network performance parameters in a manner that cannot be performed manually or objectively by a human actor. In some implementations, UAV management device 260 can receive flight parameters and network performance parameters in a manner that is the same as or similar to that described above with respect to FIGS. 1A-1D.

In some implementations, a flight plan can include a departure location (e.g., ground beneath a first airspace voxel), an arrival location (e.g., ground beneath a second airspace voxel), and/or multiple departure locations and arrival locations (e.g., for multiple deliveries of packages). Additionally, or alternatively, a flight plan can include airspace voxels to be traversed by the UAV (e.g., UAV 210), an order or sequence in which the airspace voxels are to be traversed, an overall flight time, a flight time per airspace voxel (e.g., an amount of time to spend in an airspace voxel), an overall flight speed, a flight speed per airspace voxel, and/or the like.

In some implementations, a flight parameter can include one or more analysis parameters relating to a preference of an entity associated with the UAV (e.g., an owner of the UAV, a pilot of the UAV, etc.). For example, the analysis parameters can include information that represents a risk tolerance associated with the UAV or the potential flight plan (e.g., low cost drones or payloads can have a higher risk tolerance for potential accidents than high cost drones or payloads). As another example, the analysis parameters can include information that represents a cost tolerance associated with the UAV or the potential flight plan (e.g., certain flight plans can require more expensive pilots, can require more expensive licenses, etc.). As yet another example, the analysis parameters can include information that represents a time tolerance associated with the UAV or the potential flight plan (e.g., the entity can have a total flight time requirement from departure to arrival). As yet another example, the analysis parameters can include information that represents a network tolerance associated with the UAV or the potential flight plan (e.g., a system or network with infrastructure that supports flight operations can have thresholds associated with cost to the system or network, risk to the system or network, time factors associated with the system or network, etc.).

In some implementations, a network performance parameter can include a network performance request or requirement (e.g., a communication requirement) for the proposed flight plan. Network performance parameters can include, for example, network bandwidth requirement(s), network throughput requirement(s), network latency requirement(s), network signal strength requirement(s), network signal coverage requirement(s), and/or the like during the flight and/or at an intended destination of the UAV, as described elsewhere herein (e.g., with respect to FIGS. 1A-1D above).

In this way, UAV management device 260 can receive flight parameters relating to a proposed flight plan of a UAV through airspace represented by a set of airspace voxels, and network performance parameters, to cause UAV management device 260 to determine whether network resource availability that is associated with the set of airspace voxels satisfies the network performance parameters.

As further shown in FIG. 4, process 400 can include determining whether network resource availability that is associated with the set of airspace voxels satisfies the network performance parameters (block 440). For example, UAV management device 260 can determine (e.g., using processor 320, memory 330, storage component 340, and/or the like) whether network resource availability that is associated with the set of airspace voxels satisfies the network performance parameters. In practice, UAV management device 260 can perform thousands, millions, billions, etc. of determinations regarding airspace voxels. In this way, UAV management device 260 can perform determinations regarding airspace voxels in a manner that cannot be performed manually or objectively by a human actor. In some implementations, UAV management device 260 can determine whether the network resource availability satisfies the network performance parameters in a manner that is the same as or similar to that described above with respect to FIGS. 1A-1D.

In this way, UAV management device 260 can determine whether network resource availability that is associated with the set of airspace voxels satisfies the network performance parameters to cause UAV management device 260 to approve the proposed flight plan, or to perform one or more actions to enable the UAV to access network resources that satisfy the network performance parameters.

As further shown in FIG. 4, if process 400 determines that the network resource availability that is associated with the set of airspace voxels satisfies the network performance parameters (block 440—YES), process 400 can approve the proposed flight plan (block 450). For example, UAV management device 260 can approve e.g., using processor 320, memory 330, storage component 340, and/or the like) the proposed flight plan (e.g., as described above with respect to FIGS. 1A-1D). In this case, for example, UAV management device 260 can respond to client device 280 with an approval of the proposed flight plan. Client device 280 can then cause UAV 210 to be deployed in accordance with the approved flight plan.

As further shown in FIG. 4, if process 400 determines that the network resource availability that is associated with the set of airspace voxels does not satisfy the network performance parameters (block 440—NO), process 400 can include performing one or more actions to enable the UAV to access network resources that satisfy the network performance parameters (block 460). For example, UAV management device 260 can perform one or more actions (e.g., using processor 320, memory 330, storage component 340, communication interface 370, and/or the like) to enable UAV 210 to access network resources that satisfy the network performance parameters. In practice, UAV management device 260 can perform thousands, millions, billions, etc. of actions to enable hundreds, thousands, etc. of UAVs 210 to access network resources. In this way, UAV management device 260 can perform actions in a manner that cannot be performed manually or objectively by a human actor.

In some implementations, UAV management device 260 can perform the one or more actions in a manner that is the same as or similar to that described above with respect to FIGS. 1A-1D. As one example, UAV management device 260 can adjust (or recommend an adjustment to) the proposed flight plan. In some cases, UAV management device 260 can perform one or more actions to cause some or all of the network condition information to be provided to a UAV (e.g., a UAV 210), while in flight, to control the UAV to adjust, or to recommend that the UAV adjust (e.g., autonomously), the flight path of the UAV as needed (e.g., to enable the UAV to maintain connectivity to a network (e.g., RAN 220, core network 240, and/or external network 250) and/or the like). As another example, UAV management device 260 can provide information to a UAV (e.g., UAV 210) that the UAV can utilize to request network resources from base station(s). As yet another example, UAV management device 260 can request appropriate base station(s) to allocate network resources for, or provide network resources to, a UAV (e.g., UAV 210). As a further example, UAV management device 260 can arrange to extend network coverage for a UAV (e.g., UAV 210) by deploying, or requesting deployment of, a small cell base station, a DAS, and/or the like (e.g., via an aircraft, such as another UAV 210 and/or the like).

In this way, UAV management device 260 can approve the proposed flight plan, or perform one or more actions to enable the UAV to access network resources that satisfy the network performance parameters.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations, described herein, provide a UAV management device 260 that is capable of mapping network condition information (e.g., relating to bandwidth, throughput, latency, signal strength, signal coverage, and/or the like) to airspace voxels, and utilizing the mapping to determine whether sufficient network resources are available to satisfy network performance parameters relating to a flight plan of a UAV 210 (e.g., network performance parameters that specify the network resources that are needed—the communication requirements—during a flight of UAV 210 and/or at an intended destination of UAV 210). In some implementations, UAV management device 260 is capable of causing network resources to be dynamically allocated for, and/or extended network coverage to be dynamically provided to, UAV 210 according to the network performance parameters. In some implementations, UAV management device 260 is capable of adjusting the flight path of UAV 210 to route UAV 210 through areas in the airspace where available network resources satisfy the network performance parameters. In this way, UAV 210 can maintain connectivity and/or have access to sufficient network resources (e.g., throughout the flight and/or at an intended destination of UAV 210) to carry out a mission of UAV 210's, which increases the chance of success of the mission. In addition, this permits an operator of UAV 210 to constantly monitor/track UAV 210 as needed during the mission, which reduces or eliminates a need to deploy other UAVs to supplement (or re-attempt) a mission should the network connection be interrupted or lost (thereby conserving network resources, UAV resources, and/or the like). Furthermore, providing constant network connectivity to UAV 210 reduces or eliminates a need for UAV 210 to repeatedly try to reconnect to the network when a connection is lost, which conserves power and computing resources that would otherwise be wasted by UAV 210 for reconnection purposes.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive network condition information,
the network condition information being indicative of network resource availability at a plurality of locations;
process the network condition information to associate the network resource availability identified in the network condition information with one or more airspace voxels that represent one or more three-dimensional (3D) portions of airspace corresponding to the plurality of locations;
receive night parameters relating to a proposed flight plan of an unmanned aerial vehicle (UAV) through airspace represented by a set of airspace voxels, and network performance parameters associated with the proposed flight plan;
determine that the network resource availability that is associated with the set of airspace voxels fails to satisfy the network performance parameters; and
perform one or more actions to enable the UAV to access network resources that satisfy the network performance parameters based on determining that the network resource availability that is associated with the set of airspace voxels fails to satisfy the network performance parameters.

2. The device of claim 1, wherein the network condition information relating to a location, of the plurality of locations, includes information regarding:
network bandwidth availability at the location,
network throughput at the location,
network latency at the location,
network signal strength at the location, or
network signal coverage at the location.

3. The device of claim 1, wherein the one or more processors, when performing the one or more actions, are to:
perform the one or more actions to cause an adjustment to be made to the proposed flight plan such that a flight path of the UAV traverses one or more particular airspace voxels that are associated network resource availability that satisfies the network performance parameters,
the one or more particular airspace voxels not being included in the set of airspace voxels.

4. The device of claim 1, wherein the one or more processors, when performing the one or more actions, are to:
perform the one or more actions to cause network resource request information to be provided to the UAV to enable the UAV to request one or more base stations (s), serving airspace associated with a flight path of the UAV, to allocate, for the UAV, and/or to provide, to the UAV, network resources that satisfy the network performance parameters.

5. The device of claim 1, wherein the one or more processors, when performing the one or more actions, are to:
perform the one or more actions to cause one or more base stations(s), serving airspace associated with a flight path of the UAV, to allocate, for the UAV, and/or to provide, to the UAV, network resources that satisfy the network performance parameters.

6. The device of claim 1, wherein the one or more processors, when performing the one or more actions, are to:
perform the one or more actions to cause aerial deployment of one or more small cell base stations to one or more locations associated with a flight path of the UAV to extend network coverage for the UAV such that the network performance parameters me satisfied.

7. The device of claim 1, wherein the network condition information includes historical network condition information and/or real-time, or near real-time, network condition information: and
wherein the one or more processors, when determining that the network resource availability that is associated with the set of airspace voxels fails to satisfy the network performance parameters, are to:
determine that the network resource availability that is associated with the set of airspace voxels fails to satisfy the network performance parameters based on the historical network condition information and/or the real-time, or near real-time, network condition information.

8. A non-transitory computer-readable medium storing instructions, the instructions comprising:
one or more instructions that, when executed by one or more processors, cause the one or more processors to:
receive network condition information,
the network condition information being indicative of network resource availability at a plurality of locations;
process the network condition information to associate the network resource availability identified in the network condition information, with one or more airspace voxels that represent one or more three-dimensional (3D) portions of airspace corresponding to the plurality of locations;
receive flight parameters relating to a proposed flight plan of an unmanned aerial vehicle (UAV) through airspace represented by a set of airspace voxels, and network performance parameters associated with the proposed flight plan;
determine that the network resource availability that is associated, with the set of airspace voxels fails to satisfy the network performance parameters; and
perform one or more actions to enable the UAV to access network resources that satisfy the network performance parameters based on determining that the network resource availability that is associated with the set of airspace voxels fails to satisfy the network performance parameters.

9. The non-transitory computer-readable medium of claim 8, wherein the network condition information relating to a location, of the plurality of locations, includes information regarding:
network bandwidth availability at the location,
network throughput at the location,
network latency at the location,
network signal strength at the location, or
network signal coverage at the location.

10. The non-transitory computer-readable medium of claim 8, wherein the one or more instructions that cause the one or more processors to perform the one or more actions, cause the one or more processors to:
perform the one or more actions to cause an adjustment to be made to the proposed flight plan such that a flight path of the UAV traverses one or more particular airspace voxels that are associated with network resource availability that satisfies the network performance parameters, the one or more particular airspace voxels not being included in the set of airspace voxels.

11. The non-transitory computer-readable medium of claim 8, wherein the one or more instructions, that cause the one or more processors to perform the one or more actions, cause the one or more processors to:

perform the one or more actions to cause network resource request information to be provided to the UAV to enable the UAV to request one or more base stations (s), serving airspace associated with a flight path of the UAV, to allocate, for the UAV, and/or to provide, to the UAV, network resources that satisfy the network performance parameters.

12. The non-transitory computer-readable medium of claim 8, wherein the one or more instructions, that cause the one or more processors to perform the one or more actions, cause the one or more processors to:

perform the one or more actions to cause one or more base stations(s), serving airspace associated with a flight path of the UAV, to allocate, for the UAV, anchor to provide, to the UAV, network resources that satisfy the network performance parameters.

13. The non-transitory computer-readable medium of claim 8, wherein the one or more instructions, that cause the one or more processors to perform the one or more actions, cause the one or more processors to:

perform the one or more actions to cause aerial deployment of one or more small cell base stations to one or more locations associated with a flight path of the UAV to extend network coverage for the UAV such that the network performance parameters are satisfied.

14. The non-transitory computer-readable medium of claim 8, wherein the network condition information includes historical network condition information and/or real-time, or near real-time, network condition information; and wherein the one or more instructions, that cause the one or more processors to determine that the network resource availability that is associated with the set of airspace voxels fails to satisfy the network performance parameters, cause the one or more processors to:

determine that the network resource availability that is associated with the set of airspace voxels fails to satisfy the network performance parameters based on the historical network condition information and/or the real-time, or near real-time, network condition information.

15. A method, comprising:

receiving, by a device, network condition information, the network condition information being indicative of network resource availability at a plurality of locations;

processing, by the device, the network condition information to associate the network resource availability identified in the network condition information with one or more airspace voxels that represent one or more three-dimensional (3D) portions of airspace corresponding to the plurality of locations;

receiving, by the device, flight parameters relating to a proposed flight plan of an unmanned aerial vehicle (UAV) through airspace represented by a set of airspace voxels, and network performance parameters associated with the proposed flight plan:

determining, by the device, that the network resource availability that is associated with the set of airspace voxels fails to satisfy the network performance parameters; and performing, by the device, one or more actions to enable the UAV to access network resources that satisfy the network performance parameters based on determining that the network resource availability that is associated with the set of airspace voxels fails to satisfy the network performance parameters.

16. The method of claim 15, wherein the network condition information relating to a location, of the plurality of locations, includes information regarding:

network bandwidth availability at the location,
network throughput at the location,
network latency at the location,
network signal strength at the location, or
network signal coverage at the location.

17. The method of claim 15, wherein performing the one or more actions comprises:

performing the one or more actions to cause an adjustment to be made to the proposed flight plan such that a flight path of the UAV traverses one or more particular airspace voxels that are associated with network resource availability that satisfies the network performance parameters, the one or more particular airspace voxels not being included in the set of airspace voxels.

18. The method of claim 15, wherein performing the one or more actions comprises:

performing the one or more actions to cause network resource request information to be provided to the UAV to enable the UAV to request one or more base stations (s), serving airspace associated with a flight path of the UAV, to allocate, for the UAV, and/or to provide, to the UAV, network resources that satisfy the network performance parameters.

19. The method of claim 15, wherein performing the one or more actions comprises:

performing the one or more actions to cause one or more base stations(s), serving airspace associated with a flight path of the UAV, to allocate, for the UAV, and/or to provide, to the UAV, network resources that satisfy the network performance parameters.

20. The method of claim 15, wherein performing the one or more actions comprises:

performing the one or more actions to cause aerial deployment of one or more small cell base stations to one or more locations associated with a flight path of the UAV to extend network coverage for the UAV such that the network performance parameters are satisfied.

* * * * *